Oct. 25, 1966 T. W. BAILEY 3,280,773
REFRACTORY CONSTRUCTION
Filed Oct. 23, 1964 2 Sheets-Sheet 1
FIG_1
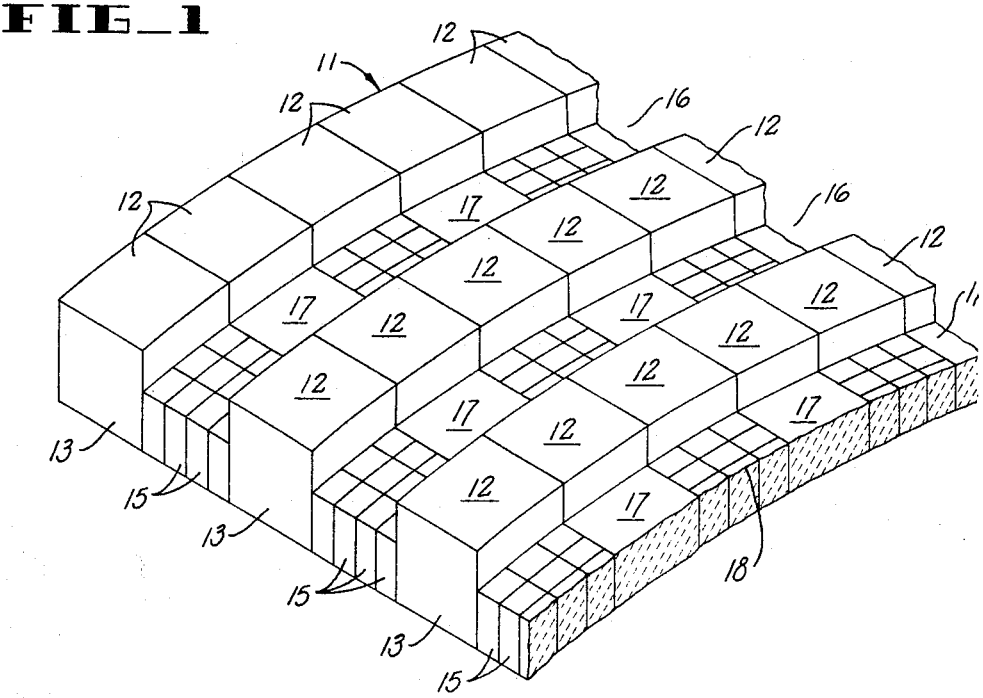
FIG_2
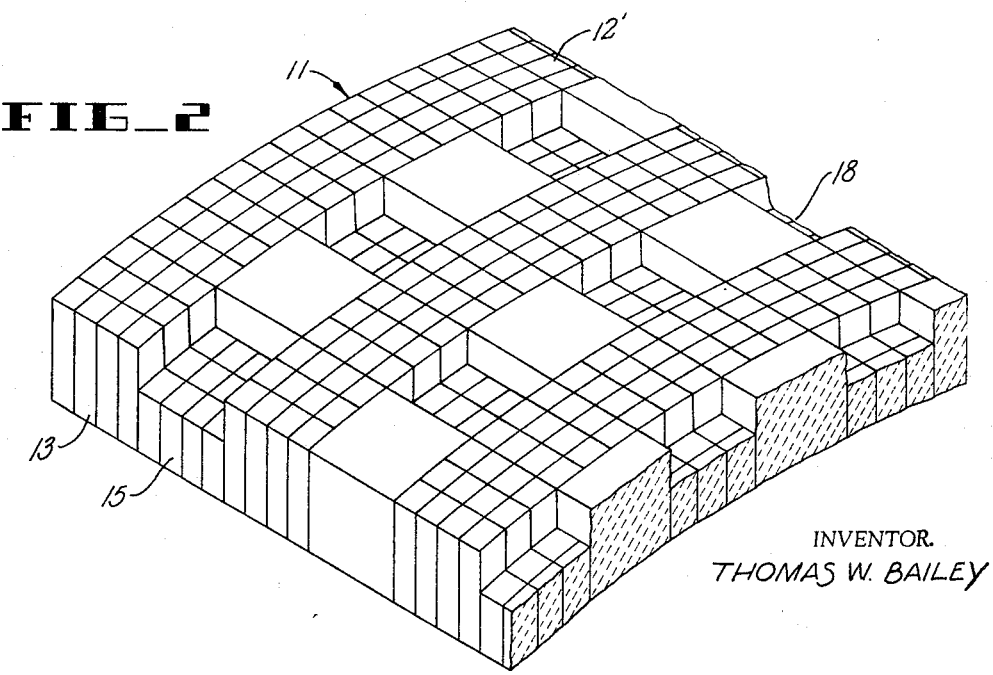
INVENTOR.
THOMAS W. BAILEY Oct. 25, 1966 T. W. BAILEY 3,280,773
REFRACTORY CONSTRUCTION
Filed Oct. 23, 1964 2 Sheets-Sheet 2
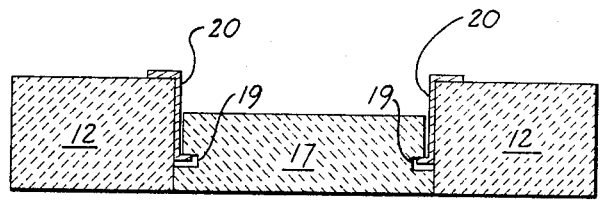
FIG_3
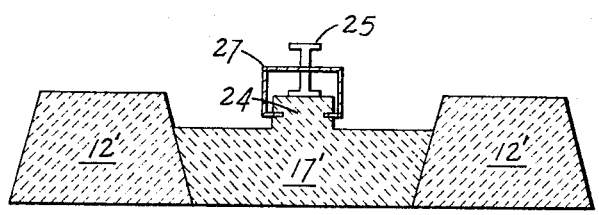
FIG_4
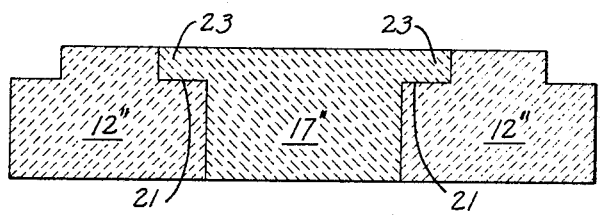
FIG_5
INVENTOR.
THOMAS W. BAILEY
BY

United States Patent Office 3,280,773
Patented Oct. 25, 1966

3,280,773
REFRACTORY CONSTRUCTION
Thomas W. Bailey, Berea, Ohio, assignor to Kaiser Aluminum & Chemical Corporation, Oakland, Calif., a corporation of Delaware
Filed Oct. 23, 1964, Ser. No. 405,999
8 Claims. (Cl. 110—99)

This invention concerns the construction of furnace roofs, particularly self-supporting furnace roofs.

Although self-supporting furnace roofs have been used for many years, for example in open hearth steel making furnaces, it has until recently been customary to make such roofs, particularly open hearth roofs, of silica brick, mainly because of the high strength exhibited by silica refractories at the operating temperatures of such furnaces.

In recent years there has been an increasing tendency to make furnace roofs, particularly open hearth furnace roofs, of basic or nonacid materials such as magnesite, periclase, chromite, and the like and mixtures of these basic or nonacid oxide refractory materials. However, because of the strength characteristics of such refractories at the operating temperatures of these furnaces, it has generally been found necessary to use the so-called suspended roof construction with these basic or non-acid refractories, the individual refractory units of the roof being hung or suspended from external supports, for example hangers inserted in the refractory brick and attached to overhead beams.

In recent years, however, there has been developed a new class of refractories comprising magnesite or periclase or magnesia and chromite or chrome ore, the formed refractory shapes being fired at such temperatures that a direct bond is developed between the magnesia and the chromite constituents of the refractory. These so-called high-fired or direct-bonded refractories show greatly enhanced strength at high temperatures and since their advent it has become feasible to consider the construction of self-supporting furnace roofs of basic refractory materials.

According to the present invention, an improved self-supporting furnace roof having thick and less thick portions extending from side to side of the roof and constituting ribs and valleys, as is well known in the art, is constructed by placing unitary refractory blocks, preferably blocks made of fused cast basic refractory material, between the ribs of the roof at spaced intervals along the length of the ribs. In the sections or cells into which such a roof is divided by the ribs and the cross blocks are inserted high-fired, direct-bonded basic refractories.

The present invention will be more fully understood from the following description taken in conjunction with the drawings in which:

FIGURE 1 is a perspective view of part of a furnace roof structure according to this invention;

FIGURE 2 is a perspective view similar to FIGURE 1 showing an alternative embodiment of a furnace roof structure according to this invention;

FIGURE 3 is a detailed cross-sectional view showing one way of suspending the cross blocks between the ribs of the furnace roof;

FIGURE 4 is a detailed cross-sectional view similar to FIGURE 3 but showing an alternative structure and means of support; and FIGURE 5 is a detailed cross-sectional view of still a further alternative structure and means of support for the cross blocks.

A furnace roof according to this invention, generally designated by the numeral 11, is constructed with portions of thicker refractory shapes 12, such portions extending from one skew back or side support (not shown) for the roof to the opposite skew back or support and forming a rib generally designated by the numeral 13, as is well known in the art. The blocks 12 from which the ribs 13 are constructed may be, as shown in FIGURE 1, large shapes, for example blocks of fused cast refractory, which extend the full width of the rib. On the other hand, the ribs 13 can be, as shown in FIGURE 2, constructed of smaller refractory shapes 12' formed, for example, by shaping and firing granular refractory, for example a mixture of chromite and magnesite, the width of the rib 13 being made up of a plurality of such smaller shapes 12'. Again, ribs 13 can be constructed of a combination of small and large refractory shapes.

Between the ribs 13 are portions of the roof constructed of less thick refractory block 15, the less thick blocks forming valleys 16 between the ribs 13. It will be understood that in laying up the roof with the thick and less thick blocks, all the refractories will be laid with their inner or hot surfaces, that is to say the surface which will be exposed to the high temperatures within the furnace when it is in operation, in the same plane and that, accordingly, the ribs 13 and valleys 16 will be formed on the outer or cold surface of the roof. The less thick refractory blocks 15 can be made of large, for example fused cast, blocks which would extend the full width of the valleys 16. However, the greatest advantages of the present invention are realized when these less thick refractory shapes 15 are of smaller size so that a plurality of such shapes is required to form the width of the valleys 16. In a preferred embodiment the less thick refractory shapes 15 will be formed from a granular mixture of magnesite and chrome ore which has been shaped and fired to a temperature at which direct bonding between the magnesia component and the chromite component results.

Between the ribs 13 at spaced intervals along their length are placed refractory blocks 17 which form cross pieces between the ribs. These refractory blocks 17 are of a size such that they extend the whole distance between adjacent ribs 13 and preferably the blocks 17 are made of fused cast, preferably basic or non-acid oxide refractory. It will be seen that the blocks 17 and the ribs 13 divide the furnace roof into sections or cells 18 composed of the less thick refractory blocks 15. It is one of the advantages of this invention that should some of the refractories 15 fail and have to be replaced, it will not be necessary to replace an entire valley section 16 of the roof in effecting repairs but merely to replace the refractory shapes 15 in a single section or cell 18 between two ribs 13 and two adjacent cross pieces or refractory blocks 17, since the blocks 15 of a single cell or section are structurally independent of those in any other cell or section.

Another advantage of this roof construction is that the cross pieces between the ribs act as stabilizers for the entire roof because they brace between the conventional ribs and give to the roof a more unitary structure.

The refractory blocks 17 can be attached to and suspended from the refractories 12 forming the ribs 13 in various ways. Thus, in one embodiment as shown in FIGURE 3, the blocks 17 are formed with recesses 19 extending downwardly from the top face of the block, said recesses being located at each side of the block and having a transverse foot receiving portion in which hangers 20 can be inserted. The upper end of the hangers 20 has a transverse portion which is hooked over and rests upon the top of the refractories 12 forming the ribs 13. Alternatively, as shown in FIGURE 4, the refractories 12' making up the ribs 13 can be of tapered or trapezoidal form, being of lesser width at the top or outer end than at the bottom or inner or hot-face end. Complementarily, the blocks 17' can also be formed of trapezoidal shape but with the smaller base of the trapezoid at the lower or inner or hot-face end and the larger base at the outer or cold-face end. Thus when the block 17' is inserted between blocks 12' in ribs 13, it will be retained in place by the meeting or abutment of the opposite tapering faces of the two blocks 12' and 17'. A third alternative, shown in FIGURE 5, is to construct the blocks 12" with shoulders 21 and to make blocks 17" with tongues or ribs 23 adapted to rest on shoulders 21 of blocks 12". In this way, blocks 17" are supported by blocks 12".

The blocks or cross pieces 17 can be of the same thickness as the refractory shapes 15 forming the valleys 16 as shown in FIGURE 1, in which case the valleys 16 will be continuous from side to side of the furnace roof. On the other hand, they can be of a thickness equal to that of the refractories 12 forming the ribs 13, as indicated in FIGURES 2 and 5. It will generally be found that the former construction, with the continuous valleys from side to side, will make it easier to keep the furnace roof free of debris, for example by blowing such debris off the roof with an air blast.

The refractory blocks 17 placed in adjacent valleys 16 can be placed at the same point along the ribs 12, as shown in FIGURE 1, so that the ribs 13 and the cross pieces 17 form a rectangular grid of sections or cells 18 filled with the less thick refractories 15. Alternatively, refractory blocks 17 can be placed in a staggered arrangement in adjacent valleys 16, as shown in FIGURE 2.

It is also possible to construct the furnace roof of this invention using the "hold-down" principle, as is well known in the art. Thus, as shown in FIGURE 4, the refractory block 17' can be constructed with a protrusion 24 on its upper or outer surface and an I-beam 25 placed parallel to the ribs 13 from side to side of the furnace roof, the ends of the I-beam being supported by the furnace buckstays (not shown) and the I-beam surface bearing on the protrusions 24 of refractory blocks 17'. Alternatively, the hold-down beams can be placed transversely to the ribs. This hold-down construction, as is known in the art, prevents rising of the refractories in the furnace roof when the furnace is brought up to operating temperature and adds stability to the roof structure by preventing buckling or other undue shifting of the refractory structure. Additionally, the hold-down beams can be used to support the cross blocks, as by hangers 27, as shown in FIG. 4.

The fused cast refractories used in the structure of this invention are refractory shapes formed by melting refractory material and casting such molten material into molds, as is well known in the art. When solidified, this cast material can, if desired, be cut or ground to the desired shape and dimensions or it can be used in its cast form.

In speaking of thick and less thick refractories, it will be understood that the roofs of open hearth furnaces, for example, are generally constructed of refractories of such a size that the valley portions of the roof are at least 9" thick when newly constructed, that is to say before erosion and wearing away of the refractories due to use of the furnace, and that the thicker portions forming the ribs are generally about 3" thicker than the valley portion and can be as thick as desired.

While furnace roofs according to this invention can be constructed with metal plates between the refractory blocks, it is contemplated that the greatest benefits of the invention will be realized in roof constructions wherein little or no metal casing or plates are used.

Having now described the invention,
What is claimed is:

1. In a furnace roof structure wherein thicker portions of the roof form ribs and less thick portions of the roof form valleys disposed between said ribs, said ribs extending from one side of said roof to the opposite side, the improvement comprising unitary refractory cross blocks extending from one rib of the roof to an adjacent rib, said refractory blocks being supported by said ribs and serving to divide the portions of the roof between said ribs into sections, the refractory structure of each section comprising a plurality of blocks of narrower extent that the width between the ribs.

2. An improvement according to claim 1 wherein at least some of said ribs are constructed of blocks extending across the full width of said ribs.

3. An improvement according to the claim 1 wherein said cross blocks are of the same thickness as the valley portions of the roof between said ribs, and the outer surface of said refractory blocks is in the same plane as the outer surface of the refractories forming said valley.

4. An improvement according to claim 1 wherein said cross blocks are attached to an external support.

5. In a self-supporting open hearth furnace roof structure wherein thicker portions of the roof form ribs and less thick portions of the roof form valleys disposed between said ribs, said ribs extending from one supported side of said roof to the opposite supported side, the improvement comprising unitary monolithic fused cast basic refractory cross blocks extending from one rib of the roof to an adjacent rib, said refractory blocks being supported by said ribs and serving to divide the portions of the roof between said ribs into sections, the refractory structure of each section comprising a plurality of blocks of narrower extend than the width between the ribs.

6. An improvement according to claims 5 wherein said ribs are constructed of fused cast basic blocks extending across the full width of said ribs.

7. An improvement according to claim 5 wherein said cross blocks are of the same thickness as the valley portions of the roof between said ribs, and the outer surface of said refractory blocks is in the same plane as the outer surface of the refractories forming said valley.

8. An improvement according to claim 5 wherein said cross blocks are attached to an external support which acts as a hold-down for the roof.

References Cited by the Examiner

UNITED STATES PATENTS

| | | | |
|---|---|---|---|
| 2,264,551 | 12/1941 | Rateau | 110—99 |
| 2,359,619 | 10/1944 | Callaway | 110—99 |
| 2,659,325 | 11/1953 | Honig | 110—99 |
| 2,717,564 | 9/1955 | Kreutzer | 110—99 |
| 2,901,990 | 9/1959 | Hutter | 110—99 |

FOREIGN PATENTS 1,194,835  5/1959  France.

FREDERICK KETTERER, *Primary Examiner.*